July 17, 1934.   H. K. T. SHERWOOD ET AL   1,966,565
DISPLAY CABINET
Filed July 22, 1932   3 Sheets-Sheet 1
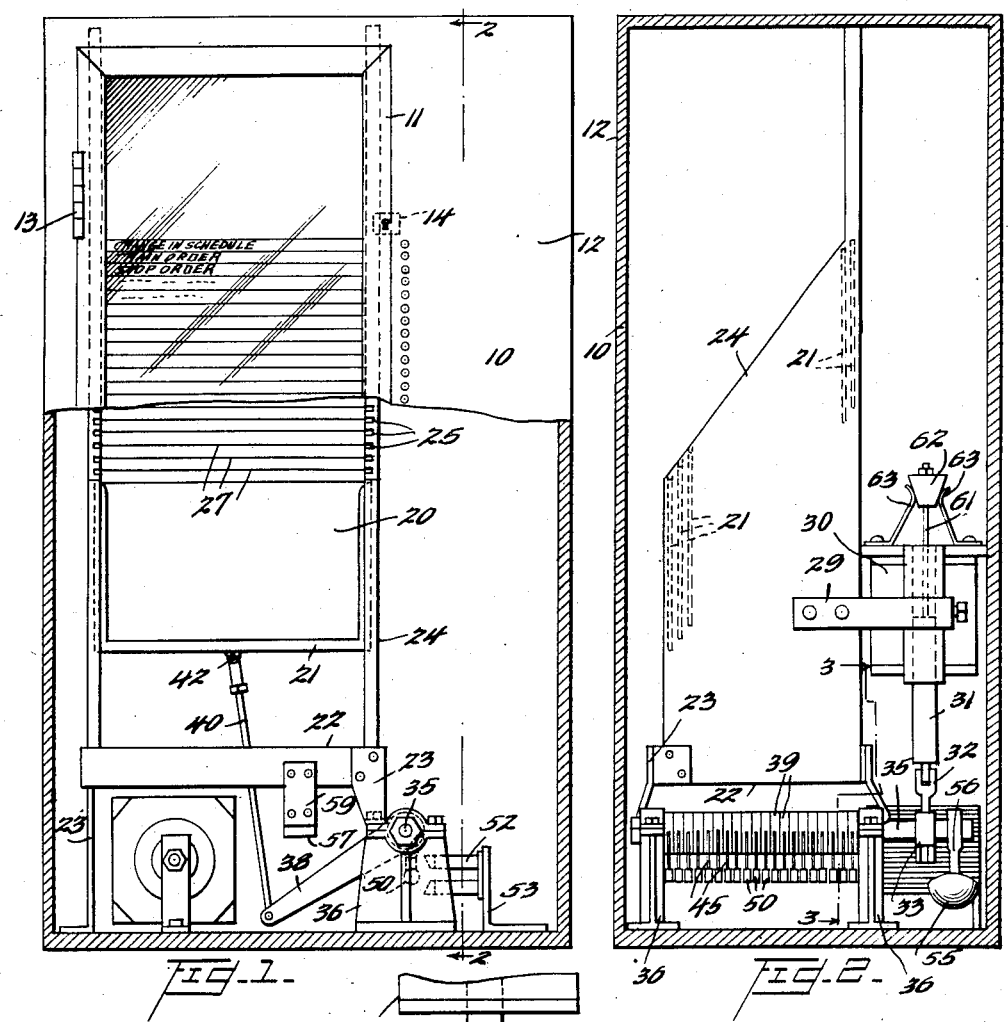
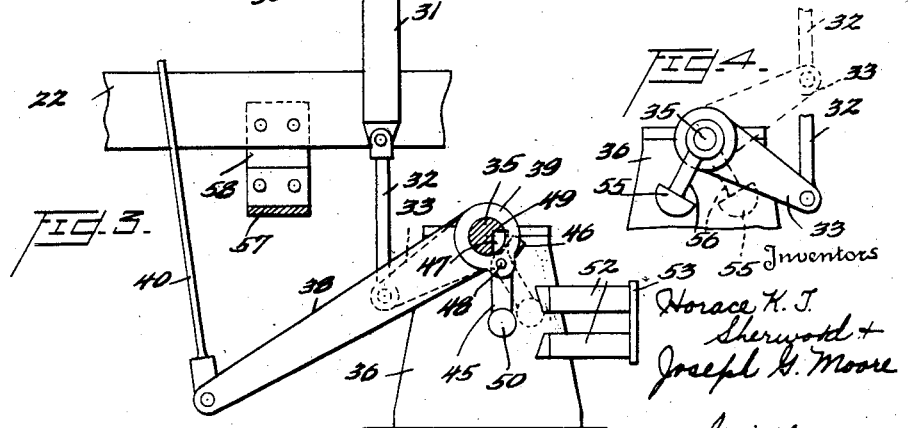
Inventors
Horace K. T. Sherwood +
Joseph G. Moore
Watson, Coit, Morse + Grindle Attorneys

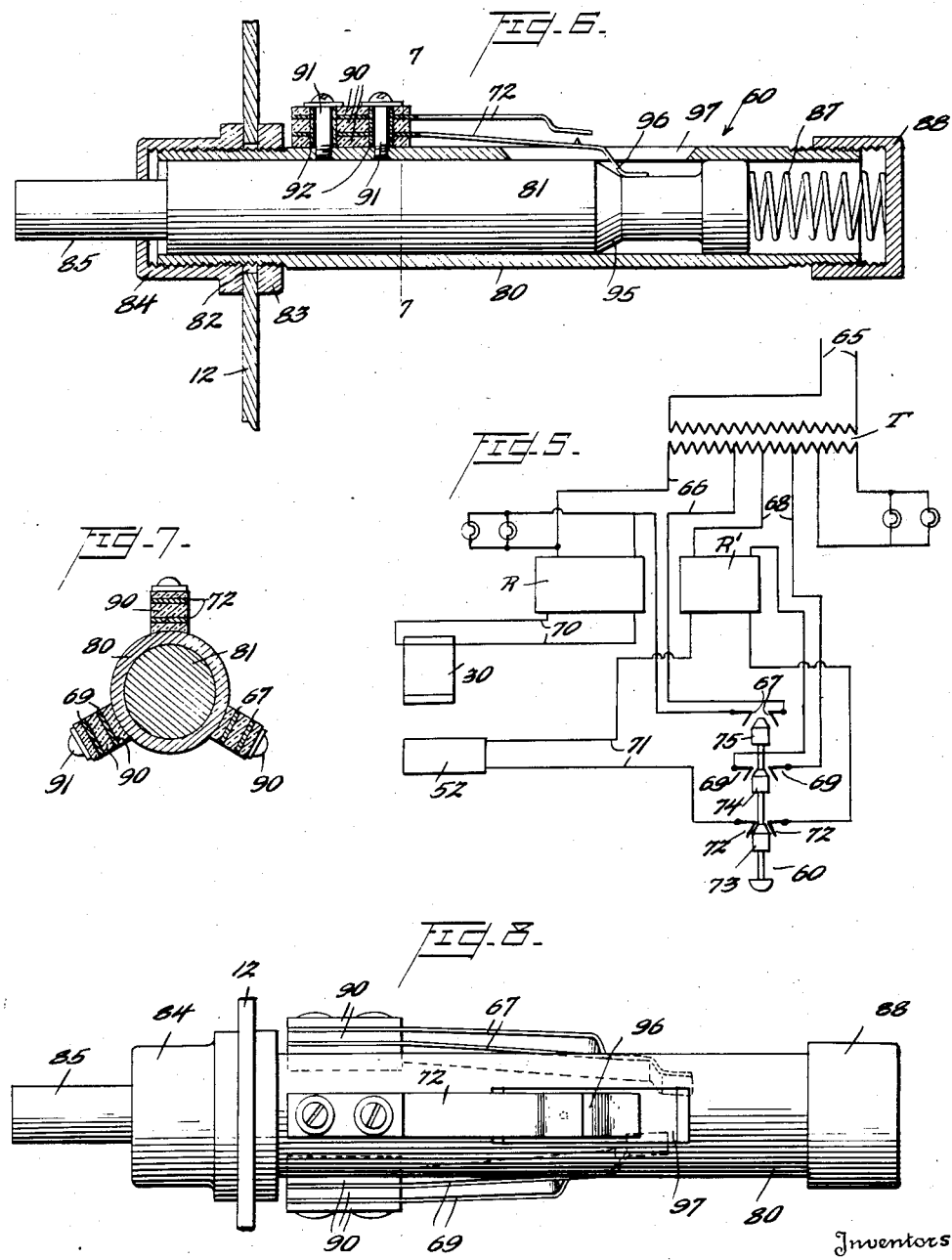

July 17, 1934.　　H. K. T. SHERWOOD ET AL　　1,966,565
DISPLAY CABINET
Filed July 22, 1932　　3 Sheets-Sheet 3
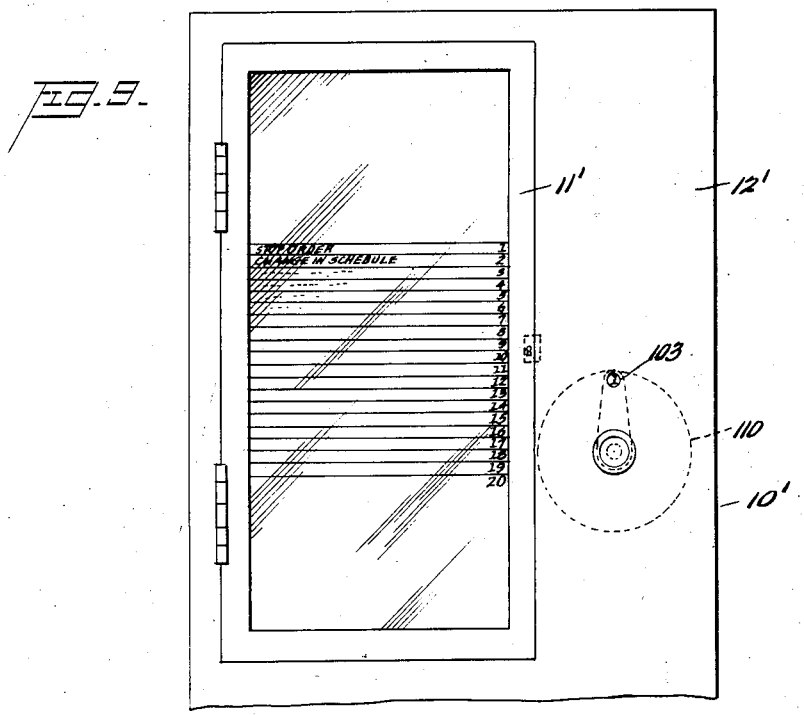
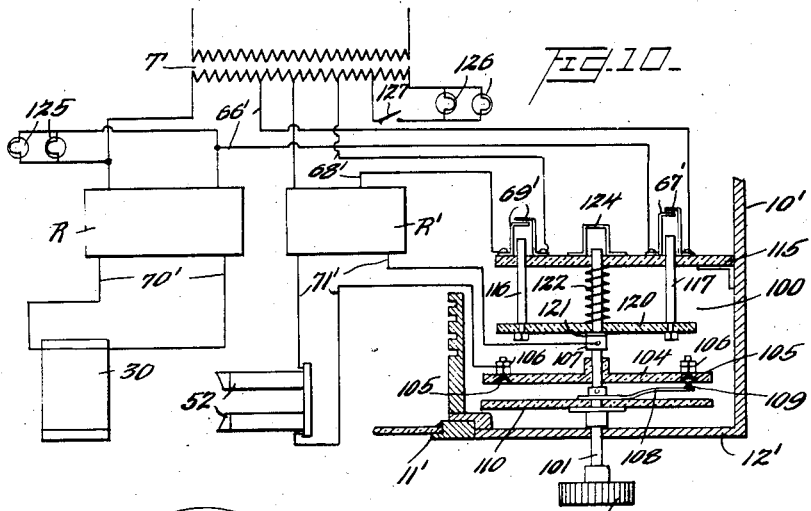
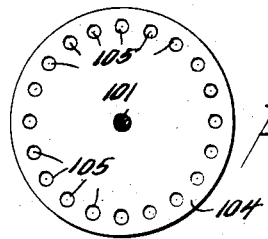

Patented July 17, 1934

1,966,565

UNITED STATES PATENT OFFICE 1,966,565

DISPLAY CABINET

Horace K. T. Sherwood and Joseph G. Moore, Albany, N. Y.

Application July 22, 1932, Serial No. 624,108

19 Claims. (Cl. 40—52)

This invention relates to display devices and more particularly to apparatus of this character which are adapted to retain and preserve display matter of various kinds and to exhibit such display matter upon the actuation of mechanism included therein.

The embodiment comprised in the present application is of the same general type as those which are the subjects of our copending applications, Serial Nos. 499,361 and 499,362, both filed December 1, 1930, and which have been respectively issued as U. S. Letters Patents Nos. 1,891,580 and 1,891,581 under date of December 20, 1932.

The general object of the present invention is to provide a novel and improved display device of this selectively changeable exhibitor type.

The invention has for its object the provision of a device which is especially adapted for employment in connection with the exhibiting of printed matter, mounted specimens, or the like, and which is designed to preserve the legibility of such printed matter and to prevent the defacement, theft, or loss of any article adapted to display therein. A few specific and suggestive examples of the utility of our novel cabinet are as follows: the display of notices, bulletins, and orders in locomotive houses, shops, factories, garages, department stores, or the like; the posting of timetables or other information in railroad stations, airports, steamship piers, or bus terminals; and the exhibition of announcements, score tallies, or similar data in golf or athletic clubs. However, the applicability of the device is not limited to the uses herein set forth but is of a scope commensurate with that of the subjoined claims wherein the present invention is defined.

The receptacle is adapted to be locked so that only authorized persons may have access to the display matter therein, but interested persons desirous of viewing any particular notice or bulletin may do so by manipulating the proper mechanism provided by the invention for exhibiting that particular item.

Another object of the invention is to provide mechanical and electrically operating means of novel construction and arrangement for selecting the desired item for observation and for moving it to and from display position.

A further object of the invention is the provision of novel electrical actuating devices for the operating means to which reference has been made.

In its preferred embodiment, the invention contemplates the provision of a cabinet in which the bulletins or other articles for display are so mounted that they normally occupy retracted positions in which identifying legends or indicia carried thereby may be observed, and may be raised to a fully displayed position in which the entire bulletin or notice may be seen. The items or articles to be exhibited are supported by suitable carrier members which are adapted to be selectively connected with a common rock shaft by means of magnetically actuable latch elements. The rock shaft to which the selected carrier member is operatively connected is rotated by means of a solenoid, to the movable core of which it is connected by means of a suitable linkage. The current for energizing the solenoid and the magnets for actuating the latches is derived from a suitable source through circuits which are controlled by the manipulation of certain novel push-button or selector switches which will be hereinafter described in detail.

Other objects and features of novelty will be apparent from the following specification when read in connection with the accompanying drawings in which certain embodiments of our invention are illustrated by way of example.

In the drawings:—

Figure 1 is a front elevation of one form of display apparatus embodying the principles of our invention, certain portions of which have been broken away to disclose interior mechanism;

Figure 2 is a vertical cross-sectional view taken on line 2—2 of Figure 1;

Figure 3 is a fragmentary cross-sectional view on an enlarged scale taken on line 3—3 of Figure 2;

Figure 4 is a fragmentary rear elevational view showing the counterweight applied to the rock shaft;

Figure 5 is a diagrammatic view of the device illustrated in Figures 1-3 showing the electrical circuits involved;

Figure 6 is a longitudinal cross-sectional view of one of the push-buttons employed in this embodiment;

Figure 7 is a transverse cross-sectional view taken on line 7—7 of Figure 6;

Figure 8 is a plan view of the push-button shown in Figure 6;

Figure 9 is a fragmentary view, in front elevation, of a modified form of display cabinet in which a single multiple selector switch is used;

Figure 10 is a partly diagrammatic view of this modified form of the device; and Figure 11 is a plan view of the contact dial of the selector switch employed in this embodiment.

Referring particularly to Figures 1 and 2 of the drawings, the bulletin cabinet or receptacle is designated generally by the numeral 10, is preferably rectangular in outline, and may be of any desired proportions. The cabinet is provided with a door 11, occupying part of its front wall 12 and being provided with a panel constructed of glass or other transparent material through which the display matter may be observed. The door is hinged to the cabinet, as indicated at 13, and may be provided with any desired type of locking means such as is suggested at 14.

The bulletins, notices, specimens, or other display matter are preferably printed, mounted, or otherwise set forth upon cards or sheets 20 which are adapted to be removably supported by the frames or carrier members 21. These carrier members are adapted to be slidably supported in the framework 22 which is mounted upon the legs or brackets 23 and comprises essentially the two side members 24. These members are provided with slots or grooves 25 for the reception of the carriers. It will be noted that the supporting means provided on the side frame members 24 are arranged in stepped relation so that the upper margins 27 of all of the cards 20 are exposed to the view of the operator at all times except when one or more of the forward display cards are held suspended. Suitable identifying legends or indicia may be printed or otherwise disposed upon these exposed portions, and it is an important feature of the present embodiment to provide actuating means for the exhibiting mechanism which are disposed in a definite readily perceived relationship with the exposed indicia bearing portions of their respective sheets or cards.

In order to raise the individual articles of display matter to their upper fully displayed positions, the following mechanism is provided. Suitably secured, as by means of the bracket 29 within the cabinet 10, is the solenoid coil 30. Arranged for vertical reciprocation within the solenoid coil is the core or plunger 31 which is connected at its lower end by means of a link 32 with the end of a crank arm 33 which is rigidly secured to the rock shaft 35. The rock shaft 35 is rotatably mounted in bearings supported by the brackets 36 and provides a common operating element to which any one of the display carriers 21 may be selectively connected. For this purpose there are provided a plurality of crank arms 38 formed with sleeves 39 which are adapted to normally loosely surround the rock shaft 35. The outer ends of these crank arms or levers 38 are connected by means of the adjustable links 40 to the carriers 21 as at 42. Upon energizing the solenoid coil 30, the core or plunger 31 will be drawn upwardly therein, thus rotating the rock shaft 35 in a clockwise direction as viewed in Figure 3.

In order to connect the selected carrier with the rock shaft so that it may be raised to display position upon rotation of the shaft, suitable locking means are provided which comprise the pivoted latches 45, the angularly disposed ends 46 of which are adapted to be moved into the groove or notch 47 provided longitudinally of the rock shaft 35. Each of these latch members 45 is pivoted to one of the sleeves 39 as at 48, and it will be apparent that, upon rotation of the rock shaft when the latches are in engaged position, as shown in broken lines in Figure 3, the shoulder 49 will contact with the upper end of the latch member 45 and thus move the sleeve 39 with its associated crank arm 38 angularly, so as to raise the carriers 21 to display position. Each of the latches 45 is provided with counterweighted ends 50 by which they are returned to released position (shown in solid lines in Figure 3) when the mechanism has been returned to its initial condition.

Suitable electrically actuated means are provided for controlling the latches 45 and, in this embodiment of the invention, comprise electromagnets 52 which are supported by the bracket 53 and, when energized, are adapted to attract the end 50 of the latch elements 45 so as to draw them to engaged position.

As will be observed from an inspection of Figure 4 of the drawings, the counterweight 55, which is carried by the arm 56 secured to the rock shaft 35 near its rearward end, is so arranged that, during the initial movement of the mechanism, its weight will assist in raising the core or plunger 31 and the selected display card carrier and, during the last portion of the operative movement, will serve to retard the movement of these mechanisms and thus act as a cushioning or shock absorbing device. It will be noted that during the return movement the counterweight 55 acts in the same way, passing through lower dead center position about halfway of its stroke and serving to accelerate this movement at the beginning thereof and to retard it at the end.

Another cushioning means is provided for the device comprising a flexible strap or band 57 preferably made of rubber, the ends of which are secured to the depending brackets 58 and 59 so that the strap passes above all of the crank arms 38 and is adapted to be contacted and stretched by these crank arms during the last portion of their upward movement in bringing the card carriers 21 to their fully displayed positions.

There is a still further shock absorbing or cushioning device provided, and this one is associated with the plunger of the solenoid. A small rod 61, made of brass or any other non-magnetic material, is connected with the upper end of the plunger 31 and is provided at its upper end with a keystone-shaped wedge block 62 which, as the plunger descends, is adapted to contact with and spread the leaf spring members 63 attached to the stationary framework of the apparatus. The laminations of the solenoid at the top of the windings are provided with an opening of sufficient size to permit the plunger 31 to pass therethrough. This enables the free passage of the plunger through the core for its entire stroke and serves to eliminate the shock and noise which usually accompany the meeting of the ordinary solenoid core with the end laminations of the coil.

In the embodiment of the invention, the mechanical features of which have just been described, the manipulative portion of the actuating mechanism comprises push-buttons 60, each of which is arranged upon the front panel of the cabinet 10 directly in line with the indicia bearing portions of the display card with which it is associated. Thus, in order to observe one of the cards 20, the operator locates the desired card from an inspection of the exposed indicia bearing portions and then pushes the button 60 which is directly opposite this portion of the card.

The electrical connections which serve to raise the selected card upon manipulation of the push-button will now be described. As clearly shown in the diagram of Figure 5, a transformer T is connected to the usual 110-volt alternating current main 65, and the secondary winding of the transformer is tapped at suitable points to derive the proper current strength for the devices to be energized. A rectifier R is connected with the transformer T by means of the circuit 66 which includes the switch contacts 67 associated with the push-button 60. A second rectifier R' is connected with another portion of the secondary windings of the transformer T by the circuit 68 which includes the contacts 69 also associated with the push-button 60. As shown in the diagram, the solenoid 30 is connected to the rectifier R by means of the circuit 70 and is actuated by the direct current derived therefrom. Each of the latch operating magnets 52 (one of which is shown in the diagram in Figure 5) is connected by means of the circuits 71 with the rectifier R' from which it is adapted to receive its direct current supply. The switch contacts 72 are included in this circuit 71 and are also associated with the push-button 60.

In the merely diagrammatic showing of Figure 5, the push-button plunger is provided with bridging members 73, 74, and 75 which are initially spaced at varying distances from their associated contact elements 72, 69, and 67, respectively. By this means, it will be readily seen, the contacts 72, 73 will be the first to close, then the contacts 69, 74 will close, and finally the member 75 will bridge the third contact 67. By this arrangement the selected latch magnet 52 will be connected with the rectifier R' during the initial movement of the push-button, and further movement of the push-button will cause the rectifier R' to be connected with the transformer T and will thus energize the latch magnet and cause one of the latches 45 to engage with the rock shaft 35. During the final portion of the movement of the push-button, the rectifier R will be connected with the transformer, and the solenoid 30 will thus be energized and the selected card raised to view. Upon releasing the pressure upon the button 60, the contacts will be broken in the reverse order from that just described.

The preferred detailed construction of the push-buttons 60 will now be described. Each of these push-button assemblies comprises essentially the tubular member 80, which is adapted to carry the contact elements, and the reciprocating plunger 81, which is adapted to slide in the tubular member 80. The forward end of the tube 80 is inserted in one of the openings 82 formed in the front panel 12. The panel is adapted to be clamped between the nut 83 and the front cap 84, which are threaded on the forward end of the tube 80. The plunger 81 is provided with the restricted forward projection or button 85 which passes through an opening in the cap 84. The plunger is urged toward the forward end of the tube by means of the coil spring 87 which is disposed between the rear end of the plunger and the rear cap 88 which is threaded on the end of the tube 80. Secured to the outer surface of the tubular member 80, preferably at equally spaced points around its periphery as clearly shown in Figure 7 of the drawings, are the pairs of contact blades which will be given the same designation as the corresponding contacts in the diagrammatic view in Figure 5 just described. Thus, the shortest contact blades, and consequently the first ones to close, are those designated 72. The next ones to be actuated are the blades 69, and the last ones to close are those indicated at 67. The rear ends of these blades are clamped between the blocks of insulating material 90 by means of the screws 91 which are threaded into the walls of the tube 80 and are insulated from the contact blades by means of the sleeves 92. The blades are provided with suitable terminals for the connection of conductors.

The plunger 81 is provided with an inclined cam surface 95 which is adapted to contact with the inwardly projecting ends 96 of the lower leaves of the leaf spring contacts referred to, these projections passing through the openings 97 provided in the walls of the tubular member 80. It will be readily seen that, as the cam surface 95 of the plunger successively strikes the portions 96 of the three contacts, the inner leaves will move outwardly and contact with the outer leaves of the switch elements.

The modified construction illustrated in Figures 9, 10, and 11 of the drawings embodies substantially the same general mechanical devices as in the case just described, the only difference being in the utilization of a rotary and reciprocating selector switch instead of the plurality of push-buttons employed in the first embodiment. This selector switch, designated generally by the numeral 100, is mounted on the front panel 12' of the cabinet 10' beside the door 11' which covers the display cards. The operating portion of the switch 100 includes the shaft 101 which is susceptible of both rotary and longitudinal reciprocatory movement. A knob 102 is provided on the end of the shaft 101 which projects through the panel 12'. The shaft 101 is arranged to pass loosely through an opening in the center of a plate 104 which is made of a suitable insulating material and is provided with a circular series of contacts 105. These contacts are provided with terminals or binding posts 106 to which conductors, forming portions of the circuits 71' which serve to connect the latch magnets 52 with the rectifier R', are attached. The other conductor of the circuit 71' is connected, as, for example, at 107, with the shaft 101, to which is also secured the flexible contact arm 108 which carries a contact 109 adapted to selectively engage the series of contacts 105.

For the purpose of designating these contacts and identifying them with respect to their associated latch magnets in order to select the proper card to be exhibited, there is provided a dial 110 which is secured to the shaft 101 and is adapted to rotate with the movable contact 109. Upon the face of this dial are inscribed numerals or other indicia which may be observed through the sight opening 103 in the panel 12'. The plate 110 and the contacts 105 and 109 are so related that when a given designation appears at the sight opening 103, the movable contact 109 is directly opposite the particular contact 105 which controls the circuit through the latch magnet 52 corresponding to the given designation in readiness to close the circuit and actuate the device for lifting the corresponding card to display position.

An insulated plate 115 is disposed rearwardly of the portions of the switch 100 which have just been described and is adapted to carry the contact blades 69' which control the circuit 68' connecting the rectifier R' which the transformer T, and the contact blades 67' which control the circuit 66' connecting the rectifier R with the transformer T. These contacts are adapted to be closed by the plungers 116 and 117 respectively. The plungers are carried by the cross head 120 through which the shaft 101 is adapted to loosely pass. A sleeve 121 is secured to the shaft 101 in advance of the cross head 120 and is adapted to abut the same when the shaft is reciprocated. A coil spring 122 serves to urge the cross head 120 and the shaft 101 toward their initial forward positions. After the switch contact 109 has been disposed adjacent the desired contact 105 by rotation of the shaft 101, the knob 102 is then pushed in so that the shaft 101 is caused to move rearwardly in order to effect the various contacts in their proper order.

It will be observed that the initial spacing of the contact 109 from the contact 105 is less than the distance between the end of the plunger 116 and the contacts 69', which distance is in turn smaller than that between the end of the plunger 117 and the contact 67'. Thus, as the shaft 101 is moved inwardly, the contact 105, 109 is first closed. Then, the cross head 120 being carried rearwardly by contact with the sleeve 121, the plunger 116 next causes the contact 69' to close, and finally the plunger 117 closes the contact 67'. By this means the circuits are closed in the same sequence as described in connection with the first embodiment which employs the plurality of push-buttons 60. A stop 124 is provided for limiting the rearward movement of the shaft 101. After observing the displayed card, the handle 102 of the selector switch is released, and, under the influence of the spring 122, the shaft 101 will move forwardly, releasing the contacts 67', 69', and 105, 109 in the reverse order from that in which they were made.

For the purpose of illuminating the cards 20 so that they may be observed in the absence of external illumination, there may be provided the lamps 125 which are connected in parallel with the rectifier R. These lamps are controlled by the switch contacts 67 or 67' and are adapted to be lighted only at times when the cards are exhibited. Lamps 126 are also provided to illuminate the push-buttons 60 or, in the case of the second modification, the dial 110, and these lamps are adapted to be connected directly to the transformer T and may be controlled by means of a switch 127. Lamps 126 are adapted to be constantly lighted in the absence of daylight or external artificial illumination.

It will be understood that the term "cards" or the like as used in the claims is intended to cover all equivalent displaying or exhibiting means susceptible of use in the same connection as the sheets or cards 20.

It will also be understood that various changes and modifications may be made in the embodiments illustrated and described herein without departing from the scope of the invention as defined by the subjoined claims.

Having thus described the invention, what is claimed as new and desired to be secured by Letters Patent is:

1. In an exhibiting device of the class described, in combination, a supporting frame, a plurality of carriers for display matter mounted in said frame and normally occupying retracted positions, a master operating means for moving said carriers including a rock shaft, selectively actuated means for connecting any one of said carriers to said rock shaft, including latch elements associated with each of said carriers, and electro-magnets for actuating said latch elements whereby, upon rotation of said rock shaft, the selected carrier with its display matter will be moved to display position.

2. In an exhibiting device of the class described, in combination, a supporting frame, a plurality of carriers for display matter mounted in said frame and normally occupying retracted positions, a master operating means for moving said carriers including a rock shaft, a plurality of sleeves loosely surrounding said rock shaft, a crank arm carried by each of said sleeves, a link connecting each of said crank arms with one of said carriers, said rock shaft being formed with a longitudinal groove, a latch element pivotally carried by each of said sleeves, an electromagnet associated with each of said latch elements for moving them into said groove, and means for selectively actuating said electromagnets to lock one of said sleeves to said shaft whereby, upon actuation of said shaft, the associated carrier together with its display matter may be moved to display position.

In an exhibiting device of the class described, in combination, a supporting frame, a plurality of carriers for display matter mounted in said frame and normally occupying retracted positions, a master operating means for moving said carriers including a rock shaft and electro-magnetic means for rotating said rock shaft, a plurality of operative connections having portions loosely surrounding said rock shaft, a latch member associated with each of said connections, said rock shaft being provided with a slot for receiving a portion of one of said latch members when in operative position, an electro-magnet associated with each of said latch member for engaging it with said shaft, means for selectively energizing said electro-magnets whereby the selected one of said carriers may be connected to said rock shaft for movement to display position upon rotation thereof, and means for energizing said electro-magnetic means for rotating said shaft.

4. In an exhibiting device of the class described, in combination, a supporting frame, a plurality of carriers for display matter mounted in said frame and normally occupying retracted positions, a master operating means for moving said carriers including a rock shaft, a solenoid winding, a movable plunger disposed within said winding, a crank arm secured to said rock shaft, a link connecting said arm with said plunger, and means for energizing said solenoid to rotate said rock shaft; a plurality of sleeves loosely surrounding said rock shaft, a crank arm carried by each of said sleeves, a link connecting each of said arms with one of said carriers, said rock shaft being formed with a longitudinal groove, a latch element pivotally carried by each of said sleeves, an electro-magnet associated with each of said latch elements for moving them into said groove, and means for selectively actuating said electro-magnets to lock one of said sleeves to said shaft whereby, upon rotation of said shaft, the associated carrier together with its display matter may be moved to display position.

5. In an exhibiting device of the class described, in combination, a supporting frame, a plurality of carriers for display matter mounted in said frame and normally occupying retracted positions, a master operating means for moving said carriers including a rock shaft, a solenoid winding, a movable plunger disposed within said winding, a crank arm secured to said rock shaft, a link connecting said arm with said plunger, and means for energizing said solenoid to rotate said rock shaft; a plurality of sleeves loosely surrounding said rock shaft, a crank arm carried by each of said sleeves, a link connecting each of said arms with one of said carriers, said rock shaft being formed with a longitudinal groove, a latch element pivotally carried by each of said sleeves, an electro-magnet associated with each of said latch elements for moving them into said groove, means for selectively actuating said electro-magnets to lock one of said sleeves to said shaft whereby, upon rotation of said shaft, the associated carrier together with its display matter may be moved to display position, and means for retarding and cushioning the movement of said mechanism near the ends of both its displaying and retracting movements.

6. In an exhibiting device of the class described, in combination, a supporting means, a plurality of display cards or the like mounted in said supporting means and normally occupying retracted positions, a master operating means for moving said cards including a rotary element, and a plurality of selectively actuated means each adapted to connect one of said cards with said rotary element, whereby, upon actuation of said master operating means, the selected card may be moved to display position.

7. In an exhibiting device of the class described, in combination, a supporting means, a plurality of display cards or the like mounted in said supporting means and normally occupying retracted positions, a master operating means for moving said cards including an electrically operated rotary element, and a plurality of means for selectively connecting any of said cards with said electrically operated rotary element whereby, upon actuation of said master operating means, the selected card may be moved to display position.

8. In an exhibiting device of the class described, in combination, a supporting means, a plurality of carriers for display matter mounted therein and normally occupying retracted positions, a master operating means for moving said carriers including a rock shaft, a solenoid, a movable core therefor, and means operatively connecting said core with said rock shaft, and separate means associated with each of said carriers for selectively connecting any one of them with said rock shaft whereby, upon actuation of said master operating means, the selected carrier with its display matter will be moved to display position.

9. In an exhibiting device of the class described, in combination, a supporting means, a plurality of carriers for display matter mounted therein and normally occupying retracted positions, a master operating means for moving said carriers including a rock shaft, a solenoid, a movable core therefor, a crank arm secured to said rock shaft, a link connecting said arm with said core, and a counterweight secured to said rock shaft, and means for selectively connecting said carriers with said rock shaft whereby, upon actuation of said master operating means, the selected carrier with its display matter will be moved to display position.

10. In an exhibiting device of the class described, in combination, a supporting means, a plurality of carriers for display matter mounted therein and normally occupying retracted positions, a master operating means for moving said carriers including a rock shaft, a solenoid, a movable core therefor, a crank arm secured to said rock shaft, a link connecting said arm with said core and an adjustable counterweight secured to said rock shaft and adapted to extend radially from said rock shaft at such an angle as to retard the movement of the solenoid core at the ends of its strokes in either direction, and means for selectively connecting said carriers with said rock shaft whereby, upon actuation of said master operating means, the selected carrier with its display matter will be moved to display position.

11. In an exhibiting device of the class described, in combination, a supporting means, a plurality of display cards or the like mounted in said supporting means and normally occupying retracted positions, a master operating means for moving said cards including a rotary element and an electro-magnet for operating the same, a plurality of separate selectively actuated electro-magnets each adapted to connect one of said cards with said rotary element whereby, upon actuation of said master operating means, the selected card may be moved to display position.

12. In an exhibiting device of the class described, in combination, a supporting frame, a plurality of carriers for display matter mounted in said frame and normally occupying retracted positions, a master operating means for moving said carriers including a rock shaft and a solenoid operatively connected with said rock shaft for effecting rotation thereof; means for selectively connecting said carriers with said rock shaft comprising a latch associated with each of said carriers and adapted to interlock with a portion of said rock shaft, an electro-magnet associated with each of said latches for actuating the same whereby, upon rotation of said rock shaft, the selected carrier may be moved to display position, sources of current for said solenoid and said electro-magnet, and electric contacts operable in sequence to energize said latch magnet and then said solenoid.

13. In an exhibiting device of the class described, in combination, a supporting frame, a plurality of carriers for display matter movably mounted in said frame and normally occupying retracted positions, a master operating means for moving said carriers, electro-magnetic means for actuating said master operating means, an electro-magnet associated with each of said carriers for operatively connecting it to said master operating means, and means for energizing the selected electro-magnet and the electro-magnetic means in the sequence named.

14. In an exhibiting device of the class described, in combination, a supporting frame, a plurality of carriers for display matter movably mounted in said frame and normally occupying retracted positions, a master operating means for moving said carriers, electro-magnetic means for actuating said master operating means, an electro-magnet associated with each of said carriers for operatively connecting it to said master operating means, a source of alternating current, two rectifiers for converting said alternating current to direct current, electrical connections between said rectifiers and said source of current, electrical connections between one of said rectifiers and the electro-magnetic actuating means for said master operating means, electrical connections between the other of said rectifiers and said electro-magnets, and means for closing certain of said electrical connections in the proper sequence to operate said carrier connecting means and then said master operating means.

15. In an exhibiting device of the class described, in combination, a supporting frame, a plurality of carriers for display matter movably mounted in said frame and normally occupying retracted positions, a master operating means for moving said carriers, electro-magnetic means for actuating said master operating means, an electro-magnet associated with each of said carriers for operatively connecting it to said master operating means, a source of alternating current, two rectifiers for converting said alternating current to direct current, electrical circuits connecting said source of alternating current with said rectifiers, electrical circuits connecting said rectifiers with said electro-magnetic actuating means for said master operating means and with said electro-magnets respectively, and switch means identifiable with selected ones of said carriers operable to first close a circuit associated with said connecting means and then a circuit controlling said master operating means.

16. In an exhibiting device as set forth in claim 15, relatively constant illuminating means for said switches and illuminating means for said display matter adapted to be controlled by certain of the electrical connections for actuating the exhibiting mechanism.

17. In an exhibiting device of the class described, in combination, a supporting frame, a plurality of carriers for display matter movably mounted in said frame and normally occupying retracted positions, master operating means for raising said carriers to display position, electrical means for actuating said master operating means, means associated with each of said carriers for connecting them to said master operating means and electrically actuated means for selectively controlling said connecting means, a source of alternating current, a rectifier for converting said alternating current to direct current, a circuit connecting said source to said rectifier, electrical connections between said rectifier and said electrical actuating means for said master operating means, a second rectifier, a circuit connecting said second rectifier with said source of current, a circuit connecting each of said electrical actuating means for said connecting means with said second rectifier, and a selector switch embodying contacts associated with said circuits, a portion of said switch being rotatable to bring the proper contacts of said last named circuits opposite each other for selecting the desired carrier connecting means, and portions of said switch being reciprocable to close all of said circuits in such sequence as to first connect said carrier selecting means with its rectifier, next to connect said rectifier with the source of current, and finally to connect the actuator for the master operating means with its associated rectifier.

18. In an exhibiting device of the class described, in combination, a supporting means, a plurality of display cards mounted in said supporting means and normally occupying retracted positions, a master operating means for selectively moving said cards into display position including an electrically operated rotary element, a separate electrically operated connecting means for connecting each card separately to said rotary element, a separate electric switch member for each card connecting means, the operation of which energizes a circuit to operate a selected card connecting means, and also to operate the rotary element.

19. In a device of the class described, in combination, supporting means, a display card or the like disposed within said supporting means and normally occupying a retracted position, means for raising said card to display position, said means comprising a solenoid, a member adapted to be rotated by said solenoid, and a magnet associated with said rotatable member and adapted to connect said card to said member.

HORACE K. T. SHERWOOD.
JOSEPH G. MOORE.